(No Model.)
P. FITZGERALD.
ELASTIC TIRE FOR VEHICLE WHEELS.
No. 545,280. Patented Aug. 27, 1895.
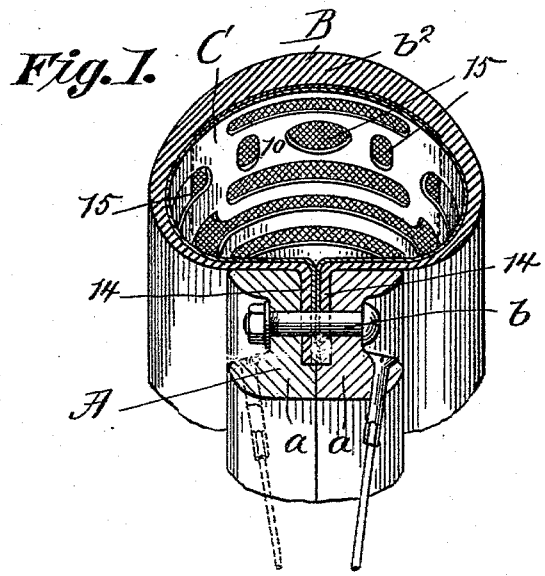
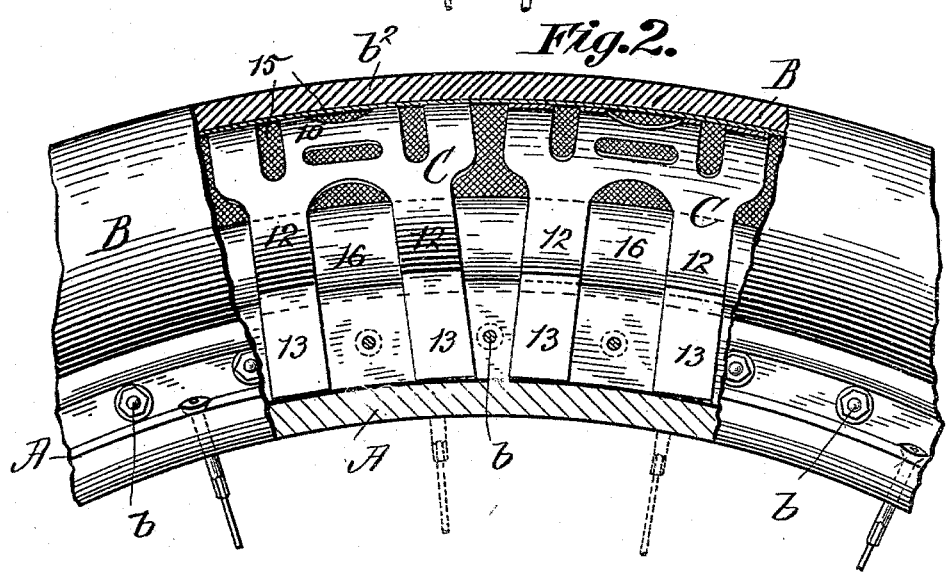
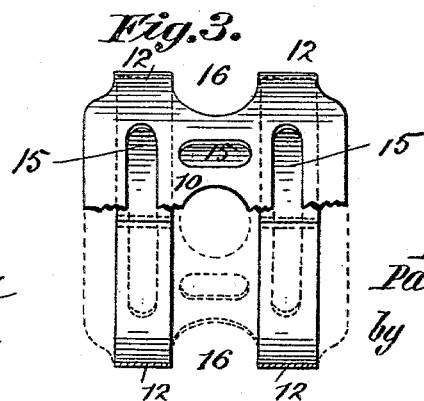
Witnesses:
J. W. Garfield
H. A. Clemons
Inventor:
Patrick Fitzgerald
by Chapin &c.
Attorneys

UNITED STATES PATENT OFFICE.

PATRICK FITZGERALD, OF SPRINGFIELD, MASSACHUSETTS.

ELASTIC TIRE FOR VEHICLE-WHEELS.

SPECIFICATION forming part of Letters Patent No. 545,280, dated August 27, 1895.

Application filed May 31, 1895. Serial No. 551,089. (No model.)

*To all whom it may concern:*

Be it known that I, PATRICK FITZGERALD, a citizen of the United States of America, residing at Springfield, in the county of Hampden and State of Massachusetts, have invented new and useful Improvements in Elastic Tires for Vehicle-Wheels, of which the following is a specification.

This invention relates to improvements in elastic tires for vehicle-wheels, the object being to provide a tire having much of the resilient nature of a pneumatic tire and yet not requiring an air-pressure therewithin, so that punctures are immaterial.

The invention consists in the constructions and combination of parts, all substantially as will hereinafter fully appear, and be set forth in the claims.

In the drawings, Figure 1 is a cross-sectional view of the tire and rim. Fig. 2 is a longitudinal section of the same. Fig. 3 is a plan view of one of the individual elastic tire-supporting sections.

In the drawings, A represents the rim, which is made in two hoop-like sections $a\,a$, placed sidewise together and retained by the series of clamping screws or bolts $b\,b$.

B represents the tire, the same consisting of rubber or rubber and canvas or other textile material, as usual in making the well-known outer shoes for inner-tube pneumatic tires, the same having, preferably, a thicker tread $b^2$, and having its edges not connected but arranged to be carried between and subject to the clamping action of the two-part rim.

C C represent the individual elastic metallic tire-supporting sections, each being of a thin spring-tempered metal, such as pen-steel or brass, and each consisting of a tread portion 10, and at its portion opposite thereto and under thereof the separate prongs or tongues 12 12, which have terminals 13 13 in the median longitudinal plane of the tire, which extend between the two layers 14 14, constituted by the edges of the tire-cover, and which are clamped between the two sections $a\,a$ of the rim. The tread portion 10 of each individual section C, together with the prongs 12 12, are bent around to a more or less nearly cylindrical form, and the tread portion is provided with a number of apertures 15 15 of any suitable form, to give lightness to the sections, and yet not to so divide them longitudinally or transversely as to impair the efficiency of their tire-supporting action. The prongs which, when the sections C are turned into the approximately cylindrical form, have their locations at the sides and bottom of the section, are separated the one from the other by the spaces 16 16, whereby the widths of the prongs are rendered so slight as to make them very flexible, and while the sections are sufficiently resilient the prongs have, nevertheless, such sufficient width as to impart all required stability to the sections. The sections C C are arranged entirely around the rim at intervals of slight separation and constitute a resilient annular skeleton body and one in which the tire B is placed, and mechanically supports the tire, obviating the necessity of an inflation and being unaffected by puncturing of the tire. It is preferred to cement the portions 13 of the metallic sections C to the portions 14 of the rubber-tire cover, and also to cement said portions 14 of the tire to the portions of the rim between which they are clamped.

Having thus described my invention, what I claim, and desire to secure by Letters Patent, is—

1. In a vehicle wheel, the combination with a rim, of a series of individual tire-supporting sections, each consisting of a thin metallic spring shell having a tread portion and separated tongues or prongs at the sides and base brought to approximately cylindrical form, the said sections being secured to the rim at intervals, and the tire inclosing the sections and supported thereby, substantially as described.

2. In a vehicle wheel, the combination with a rim composed of paired hoop-like sections, $a, a$, of the series of individual tire-supporting sections, each consisting of tread portion, 10, and the separated side and base prongs, 12, 12, which have the angular terminals in the median longitudinal plane of the section, the tire, B, of rubber, inclosing and supported by the said sections, and having its edge portions together with the said angular terminals of the metallic sections extended between the rim sections and the bolts passed transversely through the rim sections clamping the said interposed parts of the tire and metallic sections between them, substantially as described and shown.

PATRICK FITZGERALD.

Witnesses:
WM. S. BELLOWS,
K. I. CLEMONS.